United States Patent [19]

Stinson, Jr. et al.

[11] Patent Number: 4,796,333

[45] Date of Patent: Jan. 10, 1989

[54] SHELLFISH SHUCKING MACHINE

[75] Inventors: John L. Stinson, Jr.; George W. Henley, Jr., both of Fairhope, Ala.

[73] Assignee: Easy Shucker, Inc., Foley, Ala.

[21] Appl. No.: 141,413

[22] Filed: Jan. 7, 1988

[51] Int. Cl.$^4$ ............................................. A22C 29/04
[52] U.S. Cl. ......................................................... 17/76
[58] Field of Search ...................................... 17/76, 74

[56] References Cited

U.S. PATENT DOCUMENTS

| | | | |
|---|---|---|---|
| 332,403 | 12/1885 | Leduc | 17/76 |
| 845,521 | 2/1907 | Carlson | 17/76 |
| 1,737,626 | 12/1929 | Vanace | 17/76 |
| 4,393,545 | 7/1983 | O'Donnell | 17/76 |

*Primary Examiner*—Willie G. Abercrombie
*Attorney, Agent, or Firm*—Fleit, Jacobson, Cohn & Price

[57] ABSTRACT

A shellfish shucking machine and more specifically a bivalve opening device for sefely shucking or opening bivalve shellfish such as oysters, clams and the like. The shucking machine includes a base structure, an upright support structure including a handle structure and a vertically movable knife structure which includes a thin but wide blade having a rounded and sharpened lower edge to engage the bivalve and to be forced into the seam between the two halves of the bivalve shell and then rotated or twisted about its own longitudinal axis to open the shell in a manner similar to the shucking action that is used when a conventional hand-held oyster shucking knife is used to open a bivalve shellfish. The blade is provided with a transparent guard which enables observation of the blade and provides maximum at rest protection for the user with the blade being interchangeable for use with different types of bivalve shellfish.

6 Claims, 1 Drawing Sheet

SHELLFISH SHUCKING MACHINE

BACKGROUND OF THE INVENTION

1. Field of the Invention

The present invention generally relates to a shellfish shucking machine and more specifically to a bivalve opening device for safely shucking or opening bivalve shellfish such as oysters, clams and the like. The shucking machine includes a base structure, an upright support structure including a handle structure and a vertically movable knife structure which includes a thin but wide blade having a rounded and sharpened lower edge to engage the bivalve and to be forced into the seam between the two halves of the bivalve shell and then rotated or twisted about its own longitudinal axis to open the shell in a manner similar to the shucking action that is used when a conventional hand-held oyster shucking knife is used to open a bivalve shellfish. The blade is provided with a transparent guard which enables observation of the blade and provides maximum at rest protection for the user with the blade being interchangeable for use with different types of bivalve shellfish.

2. Information Disclosure Statement

Shellfish of the bivalve type have been opened manually by using a knife having a particular configuration that is manually inserted into the seam between the two halves of the bivalve and then twisted in a manner to pry open the bivalve, oyster, clam or the like so that the desired meat within the shell can be extracted. While there have been some efforts to provide shellfish opening devices, none of them utilize an arrangement in which the blade can be not only inserted into the seam but also twisted about its own axis to pry open the two halves of the bivalve. A separate information disclosure statement will be filed.

SUMMARY OF THE INVENTION

An object of the present invention is to provide a shellfish shucking machine that includes a supporting base with an upwardly extending and laterally curved stand supporting a reciprocating ram with a blade mounted on the lower end thereof and a handle structure associated with the stand, ram and a rotatable support for the handle to move the ram and blade vertically and also rotate the blade on its axis a full 360° in either direction while the ram is pushed down simultaneously thereby providing the shucker of this invention with a unique natural shucking action quite similar to that used by a person employing a conventional hand-held oyster shucking knife.

Another object of the invention is to provide a shellfish shucking machine in accordance with the preceding object in which the blade is provided with a transparent guard that covers the knife blade when not in use to afford maximum at rest protection for the user.

A further object of the invention is to provide a shellfish shucking machine for opening bivalves such as oysters, clams and the like in which the operator's hands are always free of and well clear of the blade while in operation thereby affording maximum safety with the device being lightweight, portable and easy to use.

Still another object of the invention is to provide a shellfish shucking machine in accordance with the preceding objects in which the knife blade is interchangeable in order to accept various types of blades for different types of bivalves with all of the components that engage the shellfish being constructed of stainless steel and being supported by non-slip rubber feet on the supporting base to further enhance the safety characteristics of the device.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
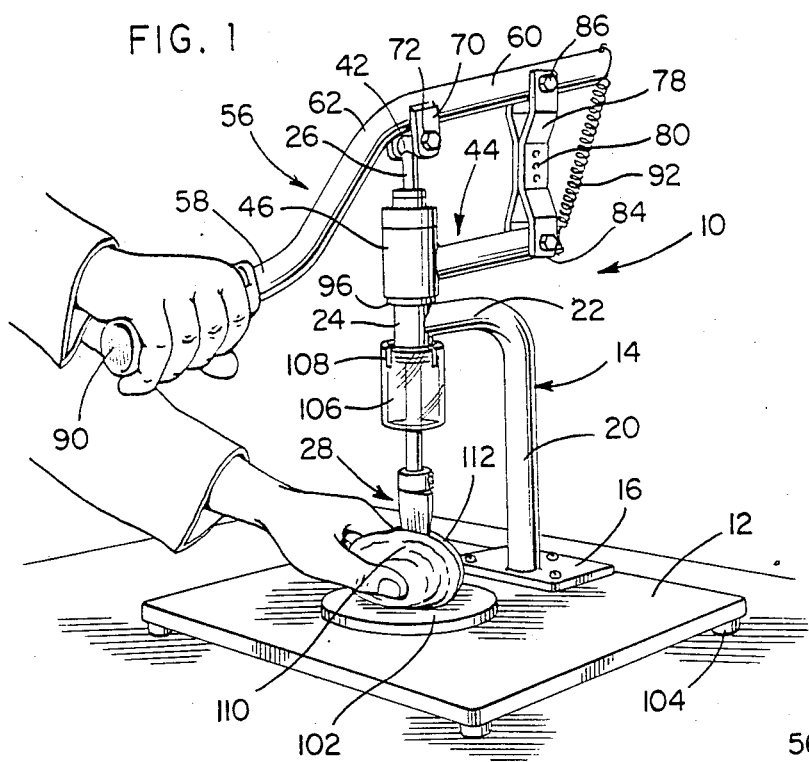
FIG. 1 is a perspective view of the shellfish shucking machine of the present invention.
Figure 3:
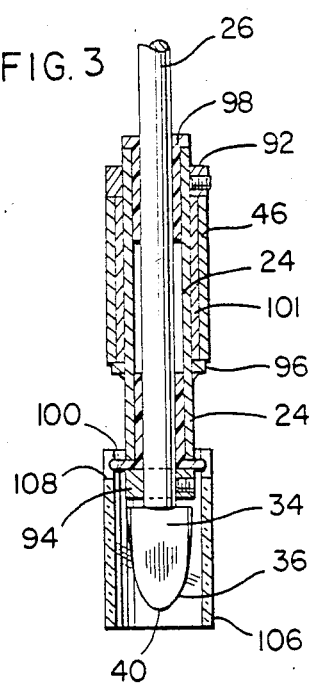
FIG. 3 is a longitudinal sectional view illustrating further structural details of the machine.

Referring now specifically to the drawings, the shellfish shucking machine of the present invention is generally designated by reference numeral 10 as illustrated in FIG. 1 and includes a supporting base 12 that may be of rigid square or rectangular construction having a stand 14 mounted thereon with the stand being in the form of a base plate 16 secured to the base 12 by suitable fasteners 18 to rigidly support the stand on the base. Upstanding from and rigid with the base plate 16 is a tubular support member 20 which forms a vertical stand and the upper end thereof is laterally curved into a horizontal support member 22 which is integral with or unitary with the vertical stand 20. The terminal end of the horizontal member 22 is provided with a tubular sleeve 24 rigidly affixed thereto with the sleeve being vertically oriented and generally parallel with the stand 20 but laterally spaced therefrom with the juncture of the member 22 and sleeve 24 being welded or otherwise rigidly connected.

Extending through the sleeve 24 is a vertical ramrod or shaft 26 having a blade generally designated by the numeral 28 attached thereto. The ramrod 26 is provided with a transverse notch 30 in the lower end thereof for receiving an upwardly extending tang or lug 32 on the knife blade 28 which is in the form of a generally flat blade 34 having inwardly curved side edge portions 36 which are sharpened or beveled as at 38 to a rounded point 40 which is sharpened from the center line by virtue of the tapered portions or beveled portions 38. The upper end of the ramrod 26 is provided with a tubular sleeve 42 which is rigid with the ramrod 26 and extends transversely thereof with the sleeve 42 being hollow and slightly longer than the diameter of the ramrod 26.

A pivot arm generally designated by the numeral 44 is positioned above the sleeve 24 on the stand and includes a tubular sleeve 46 in alignment with the sleeve 24 with the sleeve 46 being telescoped over the sleeve 24 and rotatable thereon. The sleeve 46 includes a laterally extending tubular member 48 having a beveled or inclined end 50 with a transverse aperture 52 being disposed adjacent the inclined end 50 and an aperture 54 being formed radially in the lower tip end of the tubular member 48. The tubular member 48 is secured to the sleeve 46 by welding or any other suitable manner in order to be rigid therewith.

Positioned above the pivot arm 44 is a handle assembly generally designated by the numeral 56 which includes a pair of straight tubular members 58 and 60 which are parallel to each other but offset in relation to each other by a laterally extending angularly inclined portion 62 joined to the segments 58 and 60 by smoothly curved portions. The terminal end of the handle 56 is provided with an inclined end 64 with a radial aperture 66 in the upper tip end thereof and a transverse aperture 68 spaced therefrom in a manner somewhat similar to the arrangement of the apertures in the pivot arm. The section 60 of the handle is provided with a pair of laterally extending lugs or ears 70 adjacent the juncture with the offset portion 62 with the ears 70 including apertures receiving a bolt 72 which extends through sleeve 42 on rod 26. A connecting link or bracket generally designated by the numeral 76 supports handle 56 and is in the form of two strap members having end portions 78 spaced apart and central portions offset inwardly as indicated by numeral 80 and secured together by welding or the like. The lower end of the straps or bracket include apertures in alignment with the aperture 52 with fastening bolt 84 extending through the lower end portions 78 and aperture 52 and a fastener bolt 86 extends through the upper end portions 78 and aperture 68 thus pivotally connecting the strap or bracket 86 to the pivot arm 44 and pivotally connecting the upper end of the strap or bracket to the handle 56.

Figure 2:
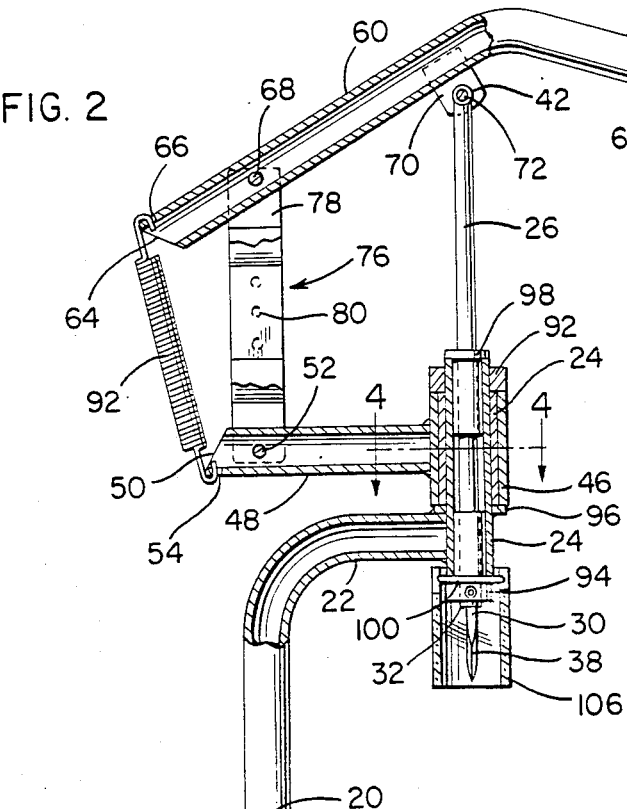
FIG. 2 is a sectional view taken substantially along the center line of the machine illustrating further structural details of the invention.
Figure 4:
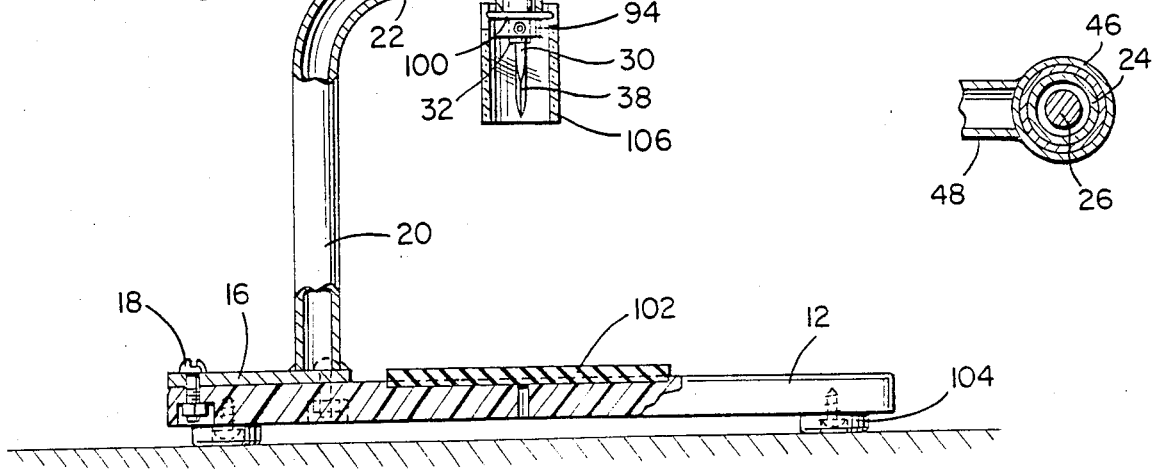
FIG. 4 is a transverse sectional view taken along section line 4—4 on FIG. 2 illustrating further structural details of the invention.

The lugs or ears 70 are connected to the upper end of the ram shaft or rod 26 by the fastener device 72 and a bushing structure which enables pivotal movement of the handle in relation to the ram shaft with the bracket 76 supporting the handle from the pivot arm. The other end of the handle is provided with a handgrip 90 to enable better gripping and manipulation thereof and the inclined ends of the handle and pivot arm are connected by a tension coil spring 92 having hook ends engaged with the apertures 66 and 54 in the handle and pivot arm, respectively, thereby biasing the handle upwardly with the handgrip 90 being disposed upwardly when in at rest position as shown in FIG. 2.

A stop collar 92 is provided on sleeve 24 which engages with the top of the pivot arm sleeve 46. A blade stop collar 94 is provided below the sleeve 24 and clamps the blade tang 32 by collapsing slot 30 in rod 26. A thrust washer 96 is provided on the sleeve 24 to support the end of the pivot arm sleeve 46. Upper and lower bushings 98 and 100 are positioned between rod 26 and sleeve 24. Also, a bushing 101 is provided between sleeve 46 and sleeve 24.

A rubber pad 102 is provided on the base 12 and a plurality of suction cups or rubber feet 104 are provided at the corners of the base to prevent it from slipping.

A transparent guard 106 of plastic material such as Lexan encircles the knife blade when in its retracted position and includes transverse notches or slots 108 to snap over the flange on the lower end of bushing 100. As the blade returns to its retracted position, it will be housed or received within the transparent blade guard or housing thereby preventing contact with the blade by a user when the device is not in use. When a bivalve 110 to be opened is placed on the rubber pad 102, the handle or control arm is gripped by the handgrip 90 which is lowered until the knife blade penetrates the seam 112 between the two halves of the bivalve. The blade can then be rotated about the longitudinal axis of the ramrod 26 and the blade so that the twisting of the blade will force the two halves of the shell of the bivalve apart thereby opening the bivalve. This rotational movement of the blade simultaneously with it being pushed down by using the ramrod gives the safety shucker of this invention a natural shucking action in a manner very similar to that used by a conventional hand-held oyster knife or bivalve shucking knife which is inserted into the seam and twisted to force the two halves of the shell apart.

In use, the bivalve is positioned on the base and specifically on the rubber pad and aligned with the rounded low profile sharpened lower edge of the blade which is then thrust downwardly using the manually operated control arm or handle connected to the ram shaft or rod thus penetrating the seam of the shellfish. When the blade has penetrated the seam to a depth of approximately $\frac{1}{2}$" to $1\frac{1}{2}$", it can be rotated by movement of the control arm connected to the ram shaft or rod on its vertical axis thereby opening the shell by the broader profile of the blade prying open or spreading apart the two halves of the shell.

The use of the shellfish shucking machine of this invention enables bivalves to be more efficiently opened or shucked in a safe manner in that the person using the device does not experience the hazards encountered when using a hand-held oyster knife which has been known to cause serious injury in the event of slippage of the knife or bivalve. With the present invention, the movement of the blade is controlled when it is moved vertically and rotated about a vertical axis.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A shellfish shucking machine comprising a stand having a base for supporting a shellfish, said stand including a vertically disposed sleeve oriented above the base, a ram shaft slidably received in said vertical sleeve with a blade mounted on the lower end thereof for penetrating into the seam of a shellfish, a control arm pivotally connected to the upper end of the ram shaft and pivotally attached to the stand for moving the ram vertically, said stand including a pivot arm mounted on said sleeve for rotational movement thereon, said pivot arm including a laterally extending member having the end of the control arm mounted thereon for pivotal movement about a transverse axis with the control arm being rotatable with the pivot arm about the sleeve for rotating the ram shaft and blade about the longitudinal axis of the ram shaft so that the blade can be twisted after penetration into the seam of the shellfish for prying the seam of the shellfish open thereby opening the shellfish.

2. The structure as defined in claim 1 wherein said blade is relatively thin for insertion into the seam of the shellfish and relatively wide for prying the halves of a shellfish open.

3. The structure as defined in claim 2 wherein said pivot arm is swivelly mounted in telescopic relation over the vertical sleeve, said blade being removably connected to the ram shaft to enable interchange thereof for enabling blades having different size and shape characteristics to be employed depending upon the shellfish to be opened.

4. The structure as defined in claim 3 together with a guard for the blade when in retracted position to prevent contact therewith during periods of non-use, said guard being transparent to enable observation of the blade and being detachably connected to said stand.

5. The structure as defined in claim 4 wherein said base includes a resilient pad thereon for engagement by a shellfish, and resilient non-slip feet on the base to prevent slippage of the shellfish shucker.

6. A device for opening a bivalve having shells joined together along a seam and capable of being opened by insertion of a thin blade and by exerting lateral thrust thereon, said device comprising a stand with a vertical sleeve slidably and rotatably receiving a ram shaft, a thin flat blade having a rounded sharpened lower edge mounted on the lower end of the ram shaft, control arm means rotatably connected to the sleeve and pivotally connected to the ram shaft for moving the ram shaft downwardly and simultaneously rotating the ram shaft after it has moved downwardly to penetrate the blade into the seam thereby rotating the flat blade to exert lateral outward forces on the two halves of the bivalve thereby opening the bivalve.

* * * * *